Patented July 30, 1935

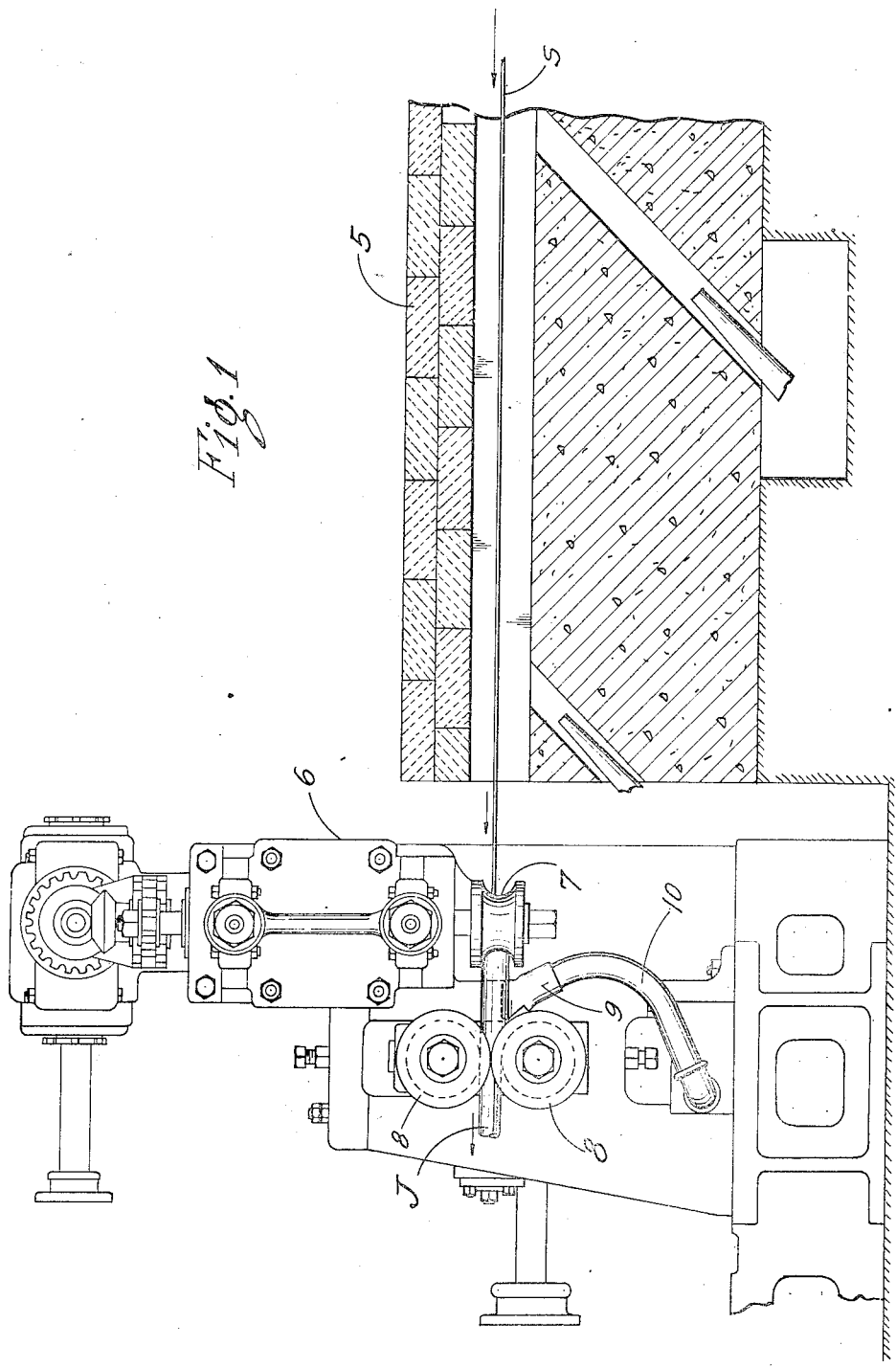

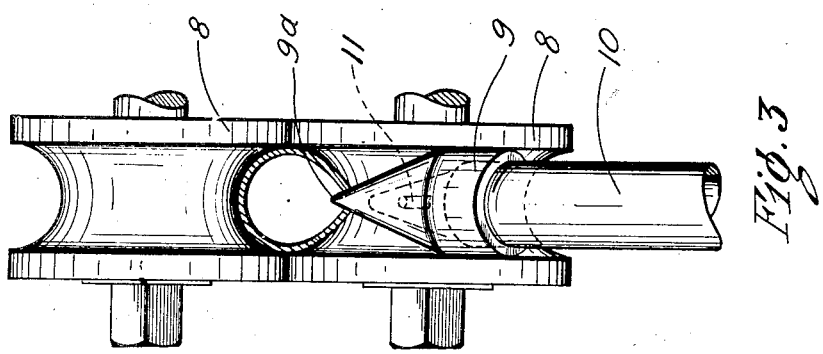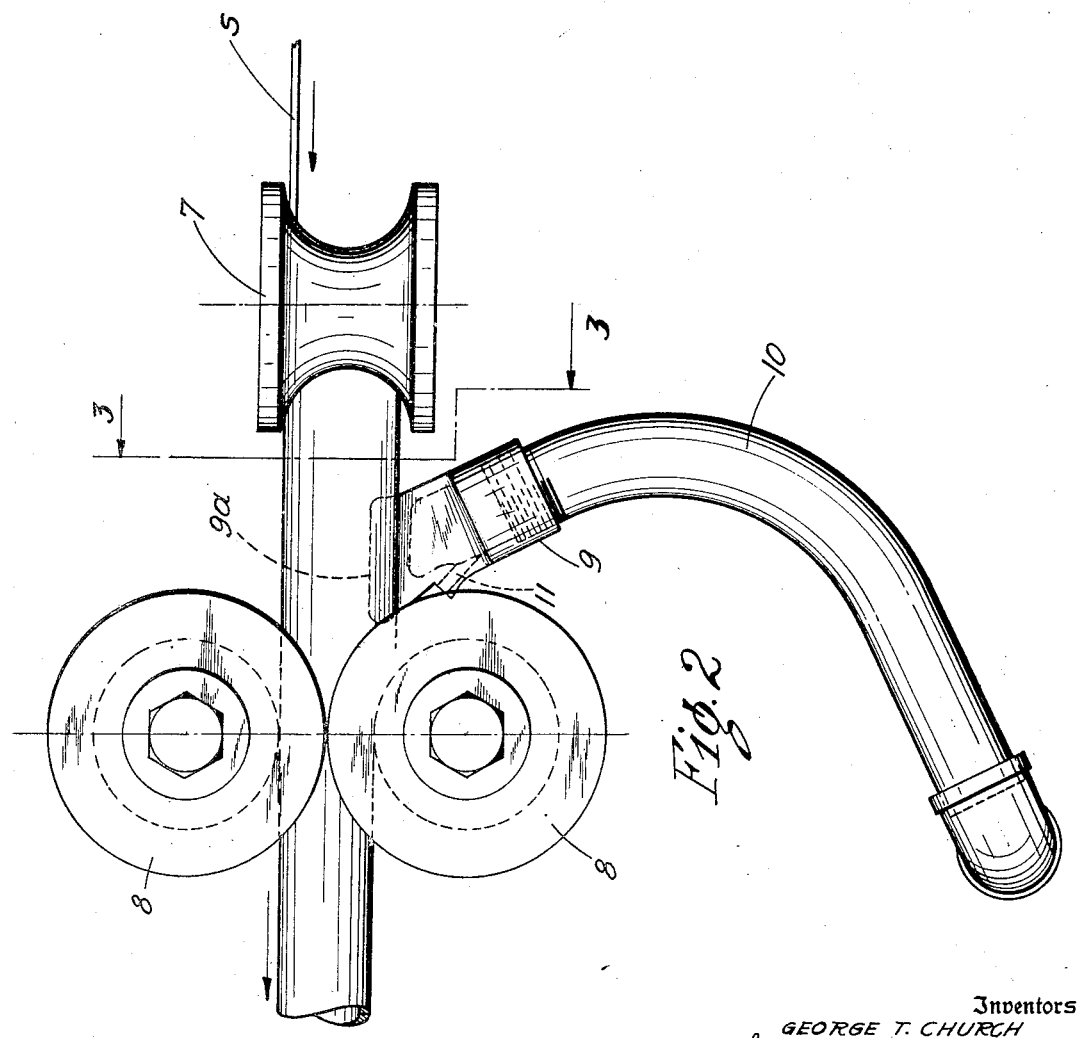

2,009,476

UNITED STATES PATENT OFFICE 2,009,476

WELDING HORN

George T. Church and Martin P. Green, Butler, Pa., assignors to Fretz-Moon Tube Company, Inc., Butler, Pa., a corporation of Pennsylvania Application December 15, 1933, Serial No. 702,514

2 Claims. (Cl. 78—87)

This invention relates to a method of and apparatus for use in the manufacture of tubing by the hot welding process in which skelp is heated throughout, approximately to welding temperature, the edges are then raised to welding temperature by gas or air blown thereagainst and then are welded together under pressure.

In the manufacture of relatively thin wall or light gauge pipe or tubing by the foregoing process considerable difficulty has heretofore been encountered in obtaining a satisfactory weld or seam. Due primarily to the thinness of the skelp and the soft or semi-plastic condition thereof when introduced into the welding rolls, a corrugation or wavy seam often resulted, and in certain instances the edges were not completely joined or welded.

Generally stated, the present method consists in heating skelp or sheet metal stock to approximately welding or working temperature, interposing a guide between the edges of a partially formed tube to maintain said edges in proper welding alignment, raising the edges to welding temperature and then bringing the edges of the tube together under pressure to effect a weld and form or round out the tube. More specifically the method consists in guiding, supporting and aligning the edges of the tube so that the angle of closure of the edges is always maintained constant while at the same time the edges are held against horizontal misalignment or waving as they are introduced into the welding rolls. This guide member also serves to remove scale from the edges of the skelp preparatory to welding.

The apparatus for carrying out the foregoing method comprises a heating furnace wherein the skelp is initially heated to welding temperature as the same is passed therethrough. The skelp as it is passed through this furnace may take the form of a substantially flat strip of metal or may be in the form of preformed butted tubing or pipe. As the skelp is discharged from the heating furnace in the case of flat strip metal it is introduced into a pair of forming rolls wherein a substantially U-shaped cross-sectional form is imparted to the heated skelp. From the forming rolls the skelp then passes into welding rolls which bring the edges of the preformed tube into abutting relation under pressure to effect a weld therebetween. Intermediate the forming and welding rolls is disposed a guide member which is adapted to support the edges of the skelp and maintain the same in horizontal alignment as the same is introduced into the welding rolls. The guide member has associated therewith a nozzle for directing a current of gaseous fluid against the edges of the skelp at the point where they are brought into abutment and welded together by the welding rolls.

In the drawings, we have illustrated a preferred type of apparatus employed in carrying out my method in conjunction with the tube mill and wherein:

Figure 1 is a fragmentary sectional side elevation of a welding furnace and tube mill with the improved guide member operatively associated therewith;

Figure 2 is an enlarged detailed view of a set of forming and welding rolls illustrating the guide member interposed therebetween; and Figure 3 is a sectional elevation taken on the line 3—3 of Figure 2.

With reference to Figure 1 the apparatus for carrying out our invention comprises a furnace which is generally indicated at 5 and a tube mill at 6, the latter being provided with a set of forming rolls 7 and a set of welding rolls 8. The flat skelp is indicated at S and the formed tube at T. In passing through the furnace 5 the skelp is heated to approximately welding temperature. As the skelp is discharged from the heating furnace it is introduced into driven rolls 7 which engage and bend the skelp into approximately oval shape as indicated in Figure 3, showing the partial formed tube after passing through said rolls. Rolls 8 are welding rolls positioned in tandem with respect to the forming rolls 7, the axes thereof being at right angles to the axes of the forming rolls and engage the tube to press the edges together to effect a weld.

Disposed intermediate the rolls 7 and 8 there is positioned a guide or aligning member 9. In the form illustrated, this member is threaded on the end of an air blast conduit or pipe 10 provided with a nozzle 11, which nozzle directs a blast of air or gas on the edges of the skelp just before they are pressed together by the welding rolls 8. The blast of air is adapted to raise the edges to proper welding temperature. The tip 9a of the guide member 9 is preferably of tapered contour and is positioned so that it projects between the edges of the partially formed tube or skelp with its sides engaging said edges, maintaining their angle of closure constant while at the same time supporting the edges and holding them in true aligned relation, thereby avoiding the formation of a wavy or corrugated seam. The guide member 9a functions to clean or remove scale from the edges of the skelp just prior to welding.

Practical use has demonstrated the effectiveness of the guide and aligning member in overcoming any tendency toward a wavy or corrugated seam with its attendant difficult weld.

It will be understood that certain changes in contour and structure of the position of the guide and aligning member may be adapted and that other forms of apparatus may be used to carry out the method within the scope of the invention as defined by the appended claims.

We claim:

1. Apparatus for making thin walled tubing including means for forming highly heated, flat skelp into tubular form with a longitudinal seam gap defined by side edges of the skelp, a set of welding rolls spaced from said shaping means and so positioned that the seam gap will be received approximately in the middle of one of said rolls, and an elongated guide member positioned in such close proximity to said seam receiving roll that there is no appreciable space between said guide and said roll and to support the seam edges for some distance until they enter the groove of the welding roll, said guide being chambered to house a fluid heating medium and being perforated to permit the discharge of said medium on to the seam edges of the metal.

2. Apparatus for making thin welded tubing including means for forming highly heated flat skelp into tubular form with a longitudinal seam gap defined by side edges of the skelp, a set of welding rolls spaced from said shaping means and so positioned that the seam gap will be received approximately in the middle of the groove of one of said rolls, and an elongated guide member projecting into the groove of the seam receiving roll and supporting the seam edges from a point between the shaping means and the seam receiving roll to the latter, said guide being chambered to house a fluid heating medium and being perforated to permit the discharge of said medium on to the seam edges while they are in the seam receiving roll.

GEORGE T. CHURCH.
MARTIN P. GREEN.